United States Patent [19]

Izutani et al.

[11] Patent Number: 4,658,257

[45] Date of Patent: Apr. 14, 1987

[54] RADAR SYSTEM

[75] Inventors: Toshiyuki Izutani; Yuichi Tomita; Hiroshi Yokoyama, all of Tokyo, Japan

[73] Assignee: NEC Corporation, Tokyo, Japan

[21] Appl. No.: 631,732

[22] Filed: Jul. 17, 1984

[30] Foreign Application Priority Data

Jul. 21, 1983 [JP] Japan ................... 58-133343

[51] Int. Cl.⁴ .................. H01Q 3/22; G01S 13/58
[52] U.S. Cl. .................. 342/372; 342/371; 342/374; 342/434; 342/117
[58] Field of Search ............ 343/368, 371, 372, 5 SW, 343/374, 16 R, 373, 433, 434, 435; 342/117

[56] References Cited

U.S. PATENT DOCUMENTS

| | | | |
|---|---|---|---|
| 3,266,038 | 8/1966 | Milne et al. | 343/16 R |
| 3,945,009 | 3/1976 | Trigon | 343/371 |
| 4,034,374 | 7/1977 | Kruger | 343/372 |
| 4,197,540 | 4/1980 | Riggs et al. | 343/5 SW |
| 4,277,787 | 7/1981 | King | 343/371 |
| 4,321,605 | 3/1982 | Lopez | 343/368 |
| 4,408,205 | 10/1983 | Hockman | 343/368 |

*Primary Examiner*—Theodore M. Blum
*Assistant Examiner*—D. Cain
*Attorney, Agent, or Firm*—Schwartz, Jeffery, Schwaab, Mack, Blumenthal & Evans

[57] ABSTRACT

A radar system includes a clock for generating timing signals of a predetermined period, an exciter for generating high frequency signals of predetermined frequencies in sequence and in time series in response to the timing signals, a transfer switch and an antenna. The transfer switch has an input terminal and a plurality of output terminals. The input terminal receives the high frequency signals and provides one of these high frequency signals at each of its outputs in accordance with the received timing signals. The antenna is connected to receive the high frequency signals from the output terminals of the transfer switch to form radar beams corresponding to the high frequency signals.

2 Claims, 9 Drawing Figures

FIG. 4
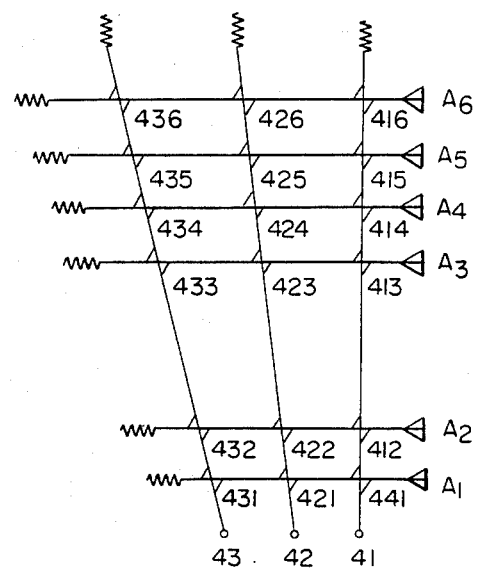
FIG. 5A
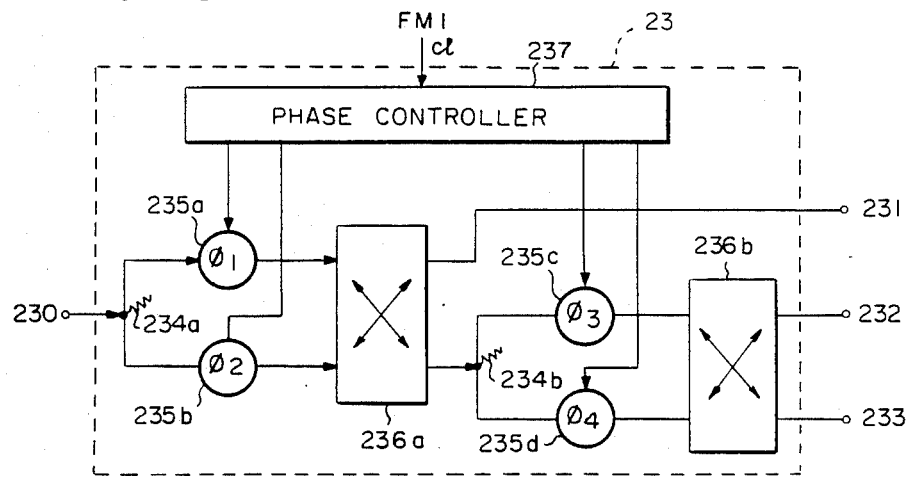
FIG. 5B
| | SELECTED OUTPUT | | |
|---|---|---|---|
| PHASE SHIFT | | 231 | 232 | 233 |
| | $\phi_1$ | -90° | 0° | 0° |
| | $\phi_2$ | 0° | -90° | -90° |
| | $\phi_3$ | 0° | -90° | 0° |
| | $\phi_4$ | 0° | 0° | -90° |

| SELECTION OUTPUT | | | |
|---|---|---|---|
| BIAS \ | 831 | 832 | 833 |
| $V_1$ | $+V$ | $-V'$ | $-V'$ |
| $V_2$ | $-V'$ | $+V$ | $-V'$ |
| $V_3$ | $-V'$ | $-V'$ | $+V$ |

RADAR SYSTEM

BACKGROUND OF THE INVENTION

This invention relates to a multiple beam scanning radar system.

In a radar systems, such as a three dimensional radar systems, requiring accurate information on range, azimuth and altitude of a target, accuracy of azimuthal and altitude information depends greatly on antenna characteristics. Therefore, an antenna forming a pencil beam with an acute directional pattern is suitable for the above-mentioned radar. A radar system rotating the antenna at high speed to scan a space by the pencil beam has been employed extensively. However, the pencil beam scanning system requires a comparatively long time for scanning the space, which may cause a restriction to update rate (radar data rate) of a target information.

A multiple beam scanning system is then taken up as an effective means to settle the above-mentioned restriction. The scanning system forms multiple beams by radiating multiple high-frequency pulse signals of different frequencies simultaneously from an antenna, so as to increase the update rate of information effectively.

In a conventional radar employing this system, a transmitter consisting of an exciter for generating a high-frequency signal in a predetermined frequency and an amplifier for amplifying the high-frequency signal is prepared in the number equal to that of beams to be formed as above, and each amplifier output is supplied to a predetermined feed terminal of the antenna through a duplexing circulator. The high-frequency signal supplied to each feed terminal is predetermined, an the number of the feed terminals is equal to the number of beams to be formed. A plurality of corresponding beams are formed by the antenna according to the high-frequency signal of a plural frequency thus supplied. On the other hand, after passing each feed terminal of the antenna, the signal received on the antenna is separated from a transmitting side by the circulator and then led to a receiver, where only a frequency component of each transmitter system is extracted, amplified and then detected. A signal processor receives a plural frequency component thus obtained and performs normal radar signal processing necessary for target acquisition and display.

The above-described conventional multiple beam scanning radar system requires one transmitters for each beams to be formed, therefore not only does the configuration become complicated but also the system is very costly.

SUMMARY OF THE INVENTION

A principal object of this invention is to provide a radar system capable of forming multiple beams through a simple configuration.

Another object of this invention is to provide a radar system capable of forming multiple beams and scanning the beams thus formed in one dimension.

According to this invention, there is provided a radar system comprising a timing controller an exciter, a transfer switch, and an antenna. The timing controller generates a timing signal of a predetermined period, an exciter for generating a high-frequency pulse signal of a predetermined frequency in sequence and in time series in response to the timing signal, a transfer switch has an input terminal to receive the high-frequency signal from the exciter and a plurality of output terminals. Each high-frequency signal is fed to one output terminal is determined by the high-frequency signal of the predetermined frequency in response to the timing signal. The antenna has feed terminals for receiving the high-frequency signals from the plurality of output terminals of the transfer switch for forming beams corresponding to the high-frequency signals supplied to the feed terminals. According to this invention, a radar system simple in configuration capable of scanning beams in two dimensions is realized by an arrangement wherein outputs from the exciter are distributed to a plurality of antenna units, a phase shifter for one-dimensional scanning is provided on each antenna unit, which is properly controlled, or the plurality of antenna units are rotated mechanically without providing the phase shifter.

Other objects and features of this invention will be apparent from the following description with reference to the accompanying drawings.

BRIEF DESCRIPTION OF THE DRAWINGS

FIG. 4 is a drawing representing one example of an antenna usable in this invention.

FIGS. 5A and 5B are drawings representing one example of a transfer switch usable in this invention and its performance timing respectively.

DETAILED DESCRIPTION OF THE PREFERRED EMBODIMENTS

Figure 1:
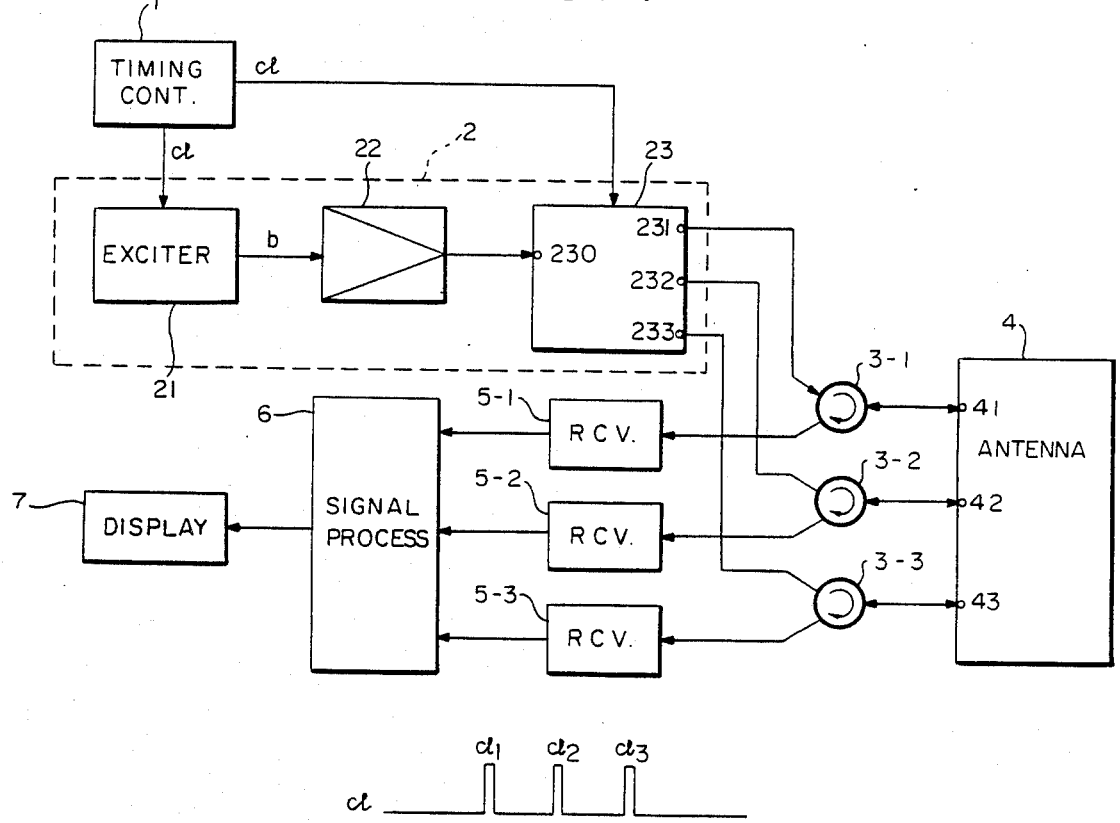
FIG. 1 is a basic block diagram of a radar system according to this invention.
Figure 2:
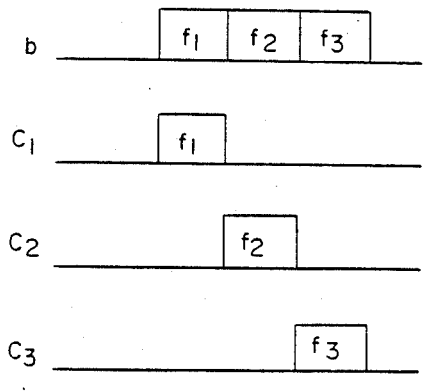
FIG. 2 is a performance timing chart of the constitution given in FIG. 1.
Figure 3:
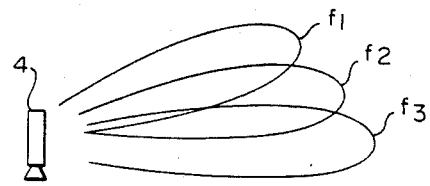
FIG. 3 is a drawing representing beams obtainable on the radar system of this invention shown in FIG. 1.

Referring to FIG. 1 and FIG. 2, a clock Cl is generated from a timing controller 1 at a predetermined period. A transmitter 2 is comprised of an exciter 21, an amplifier 22 and a transfer switch 23. The exciter 21 outputs high-frequency pulse signals of predetermined three frequencies in response to the clock from the timing controller 1. Specifically, a high-frequency signal of frequency $f_1$ is generated as shown in FIG. 2b in response to a clock $Cl_1$, and high-frequency signals of frequencies $f_2$ and $f_3$ are generated in response to clocks $Cl_2$ and $Cl_3$ in sequence and in time series. The signals generated in time series are amplified on the amplifier 22 and then supplied to an input terminal 230 of the transfer switch 23. The transfer switch 23 outputs signals shown in FIG. 2 $C_1$, $C_2$ and $C_3$ through output terminals 231, 232 and 233 in response to the clocks $Cl_1$, $Cl_2$ and $Cl_3$. The high-frequency signals $C_1$, $C_2$ and $C_3$ are inputted to predetermined feed terminals 41, 42 and 43 of an antenna 4 by way of circulators 3-1, 3-2 and 3-3, respectively. Since the high-frequency signals of frequencies $f_1$, $f_2$, $f_3$ have been supplied to the feed terminals 41, 42, 43, three beams, namely those of frequencies $f_1$, $f_2$ and $f_3$, are formed from the antenna 4 as shown in the elevation view of FIG. 3. As is well known, for example, a reflector antenna with multiple primary feeds, Blass matrix array and Butler matrix array (by R. C. Hansen, "Microwave Scanning Antennas", Vol. III, p.247 to p.263, Academic Press, 1966) and further Rotman lens array (by W. Rotman, "Wide-Angle Microwave Lens for Line Source Applications", IEEE Trans., AP, p.623 to p.632, November 1963) can be employed for the configuration wherein a radiant beam will be formed for each feed terminal of the antenna.

FIG. 4 represents the above-mentioned Blass matrix array which is one type of antenna that can be used in this invention, wherein feed terminals 41, 42 and 43 are coupled with antenna elements $A_1$ to $A_6$ through couplers 411 to 416, 421 to 426 and 431 to 436. The high-frequency signals of frequencies $f_1$, $f_2$ and $f_3$ are inputted in time series to the feed terminals 41, 42 and 43 and sent in sequence from the antenna elements $A_1$ to $A_6$. Each feed terminal and each antenna element are terminated on a resistive terminator.

An example of a configuration wherein a waveguide ferrite switch suitable for changing a large power is employed for the transfer switch 23 and its performance timing are repressed in FIGS. 5A and 5B respectively. In response to a timing signal from the timing controller 1, a phase shifting control circuit 237 sets a shift rate for 90° ferrite phase shifters 235a to 235d at either −90° or 0°. The high-frequency signals supplied to the input terminal 230 are branched into two by a waveguide magic T 234a and thus input to the phase shifters 235a and 235b. Outputs of the phase shifters 235a, 235b are supplied into a known 90° waveguide 3 dB coupler 236a, and one output of the coupler 236a is supplied to the output terminal 231. Another output of the coupler 236a is branched into two by a waveguide magic T 234b and supplied to the 90° ferrite phase shifters 235c and 235d. Further, each output of the phase shifters 235c and 235d is inputted to a 90° waveguide 3 dB coupler 236b, and two outputs of the coupler 236b are supplied to the output terminals 232 and 233. In such configuration, to achieve selective supply of the high-frequency signal to the output terminal 231, phasing quantity is set at −90° for the phase shifter 235a and that on the other phase shifters is set at 0°. For selective supply of the high-frequency signal to the output terminal 232, the phasing quantity will be set at −90° in the phase shifters 235b and 235c, and that is the other phase shifters can be set at 0°. Further for selective output of the high-frequency signal to the output terminal 233, the phasing quantity on the phase shifters 235b and 235d will be set at −90°, and 235a and 235c can be set at 0°. The relationship between the selected phasing quantities in the phase shifters and selective output terminals is shown collectively in FIG. 5B.

As described above, according to this embodiment, beams of different frequencies can be formed almost simultaneously by only one transmitter. Strictly speaking, however, beams of each frequency are formed in time series as described, but since the interval of occurrence is extremely short, it can be regarded as almost simultaneous.

At the time of reception, on the other hand, reflected signals of each beam from a target or the like are received simultaneously, sent to receivers 5-1, 5-2 and 5-3 by way of the circulators 3-1, 3-2 and 3-3 respectively, where radar signals of each frequency component are separated, amplified, detected and then sent to a signal processor 6 (see FIG. 1). A predetermined radar signal processing is carried out in the signal processor 6, and a signal thus obtained is supplied to a display 7 therefor.

Figure 6:
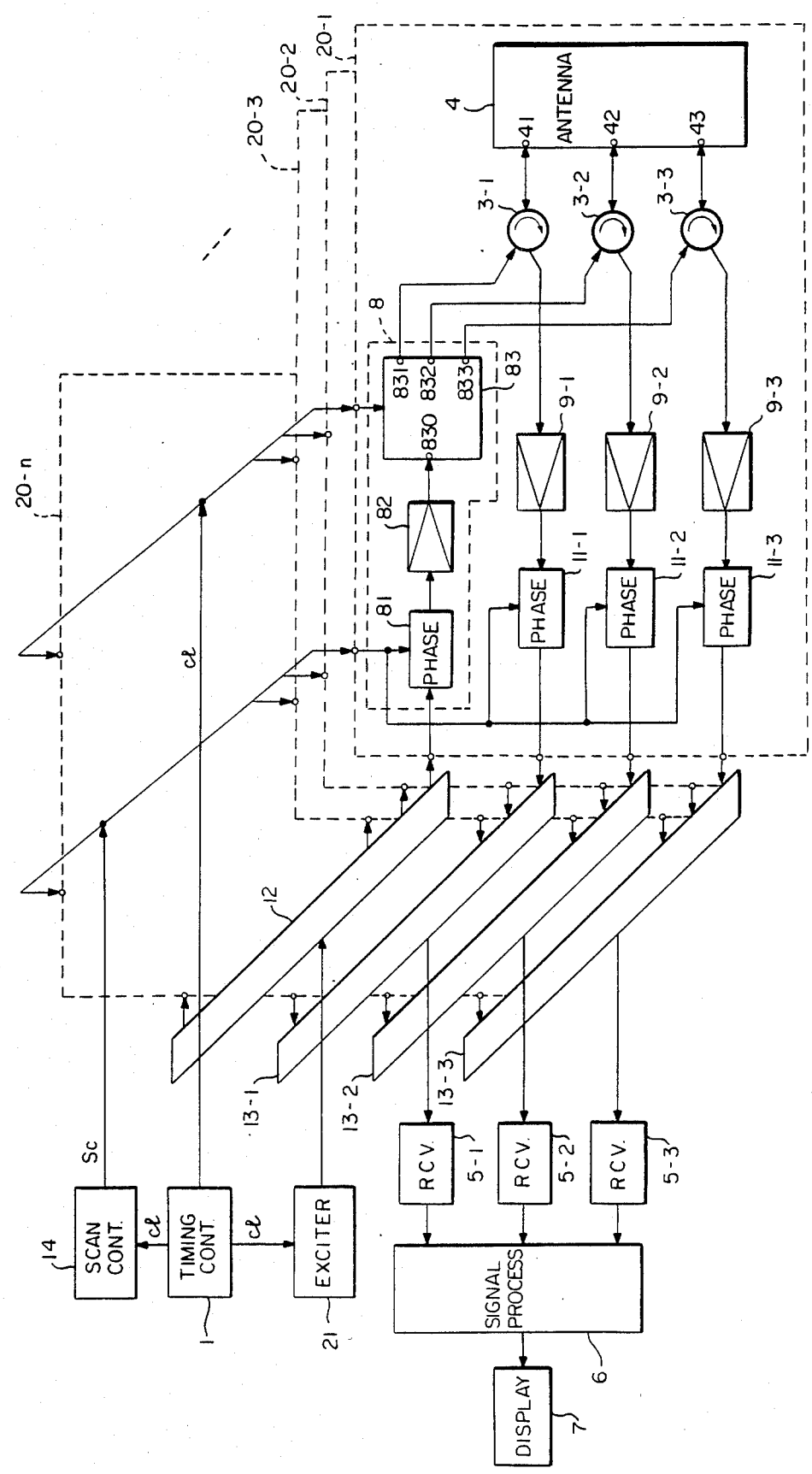
FIG. 6 is a block diagram of another embodiment of this invention.

FIG. 6 represents another embodiment of this invention, which relates to a phased array radar for scanning three beams formed in the vertical plane electronically in the horizontal plane. This embodiment comprises a plurality (n) of antenna units. Each unit is provided with a transmitting system and a receiving system with a phase shifter for horizontal scanning added to the transmitting system and the receiving system basically as shown in FIG. 1. A phasing quantity of the phase shifter of each antenna unit is changed according to a scanning signal Sc from a beam scanning controller 14.

The high-frequency pulse signals of frequencies $f_1$, $f_2$ and $f_3$, for example, are sent to a power distributor 12 from the exciter 21 in response to the timing signal (clock signal) Cl from the timing controller 1 as in the case of the embodiment given in FIG. 1. The power distributor 12 distributes the high-frequency pulse signals from the exciter 21 to the antenna units 20-1 to 20-n. A distributed signal is sent to a phase shifter 81 of the antenna unit 20-1, for example. Upon receipt of the signal Cl from the timing controller 1, the beam scanning controller 14 sends a scanning control signal Sc to the phase shifter (81, for example) of each antenna unit for horizontal beam scanning. The phase shifter then shifts the distributed signal in accordance with the scanning control signal Sc for horizontal scanning. The signal is then supplied processed signal to an amplifier 82. The signal amplified by the amplifier 82 is input to an input terminal 830 of a switch 83. The transfer switch 83 operates likewise as in the case of FIG. 1 in response to the clock signal Cl and outputs the high-frequency pulse signals of frequencies $f_1$, $f_2$ and $f_3$ in time series from output terminals 831, 832 and 833. The signals $f_1$, $f_2$ and $f_3$ are supplied to the feed terminals 41, 42 and 43 of the antenna 4 by way of the circulators 3-1, 3-2 and 3-3, and thus vertical three beams are formed as in the case of FIG. 3.

On the other hand, signals received by the antenna 4 are amplified each in amplifiers 9-1 to 9-3 by way of the circulators 3-1 to 3-3, input then to phase shifters 11-1 and 11-3, and subjected to a phase shift likewise as in the case of transmission. The phasing quantity varies according to a difference in characteristics of the power distributor 12 and power combiners 13-1 to 13-3 and also according to weighing in the power combiners 13-1 to 13-3, however, it shall be equal in this embodiment. Outputs of the phase shifters 11-1 to 11-3 are supplied to the power combiners 13-1 to 13-3 prepared to correspond to each beam. The power combiners 13-1 to 13-3 combine receiving signals from the antenna units 20-1 to 20-n which correspond to each beam and send them to the receivers 5-1 to 5-3. The receivers 5-1 to 5-3, the signal processor 6 and the display 7 are the same as in the embodiment of FIG. 1.

The above embodiment comprises providing the phase shifters 81, 11-1 to 11-3 in the transmitting system and the receiving system of the antenna units 20-1 to 20-n and controlling these phase shifters by a control signal from the beam scanning controller 14, thereby electronically scanning in the horizontal plane three pencil beams which are formed in the vertical plane.

In this embodiment, the three beams can be formed in one transmitting system, which may be advantageous both in structure and cost as compared to a conventional system. Then, a waveguide ferrite switch is used for the transfer switch 23 in the embodiment shown in FIG. 1 so as to cope with a high power. In order to handle the power necessary, one utilizes in this embodiment a spatial synthesization of outputs of n sets of transmitting modules. The necessary power per set of the transmitting module is thus lessened to 1/n as compared with the embodiment of FIG. 1. Accordingly in this embodiment, a miniature, lightweight and cheap device a PIN diode switch, for example, can be used for the transfer switch 83.

Figures 7A, 7B:
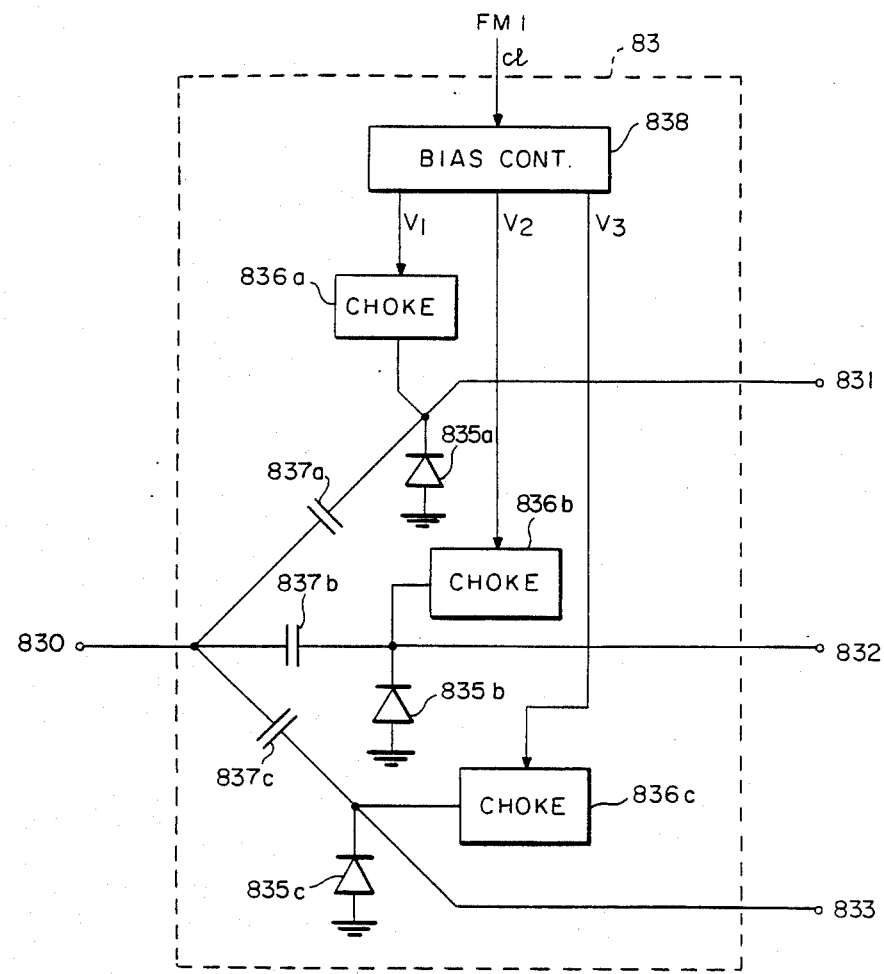
FIGS. 7A and 7B are drawings representing a preferred example of a circuit for the transfer switch given in another embodiment in FIG. 6 and its performance timing respectively.

FIGS. 7A and 7B represent an example of configuration of the transfer switch utilizing a diode and its performance timing respectively. The input terminal 830 is branched into three, DC cutting capacitors 837a, 837b, 837c are connected in series in the branch lines, which are connected to the output terminals 831, 832, 833 respectively. Further, PIN diodes 835a, 835b, 835c are connected in parallel. In response to timing signals, a voltage setting circuit 838 supplies signals $V_1$, $V_2$, $V_3$, for example, a DC voltage $+V$ or $-V'$ different in polarity to the diodes 835a, 835b, 835c by way of high frequency stopping chokes 836a, 836b, 836c, thereby controlling a connection between each branch line and output terminal. A relation between selective output terminals of the high-frequency signal and DC voltages supplied to each diode is given in FIG. 7B.

Then, it is apparent that the phase shifters 81, 11-1 to 11-3 and the beam scanning control circuit 14 will be omitted, and the antenna units 20-1 to 20-n can be rotated mechanically.

What is claimed is:

1. A radar system comprising:
    (a) clock means for generating a timing signal of a predetermined period;
    (b) exciter means for generating a high-frequency signal whose frequency is changed in response to said timing signal to have first and second values different from each other;
    (c) a transfer switch including an input terminal for receiving said high-frequency signal and first and second output terminals, said transfer switch separating said high-frequency signal into first and second separated signals according to said timing signal, said first and second separated signals having an individual frequency of said first and second values, respectively, said transfer switch outputting said first and second separated signals at said first and second output terminals, respectively;
    (d) first and second circulators connected to said first and second output terminals for receiving said first and second separated signals respectively;
    (e) an antenna unit including;
        (1) first and second feed terminals connected to said first and second circulators respectively for receiving said first and second separated signals,
        (2) an antenna element,
        (3) first and second feed lines connected to said first and second feed terminals respectively and selectively coupled to said antenna element,
        (4) said antenna unit forming first and second transmission beams in accordance with said first and second separated signals applied to said first and second feed lines, projecting said first and second transmission beams from said antenna element to receive first and second reflected beams of said first and second transmission beams, and outputting first and second power signals corresponding to said first and second reflected beams at said first and second feed terminals, respectively;
    (f) first and second receivers for receiving said first and second power signals via said first and second circulators, respectively; and
    (g) a signal processor connected to said first and second receivers for processing said first and second power signals.

2. A radar system comprising;
    (a) a timing controller for generating a timing signal of a predetermined period;
    (b) an exciter for generating a high-frequency signal whose frequency is changed in response to said timing signal to take first and second values different from each other;
    (c) a power distributor for distributing said high-frequency signal;
    (d) a scan controller for generating a scan signal in synchronization with said timing signal;
    (e) a plurality of antenna units each including,
        (1) an input phase shifter connected to said power distributor and said scan controller for receiving the distributed high-frequency signal and for phase-shifting said distributed high-frequency signal by a predetermined amount in response to said scan signal,
        (2) a transfer switch connected to said input phase shifter and said timing controller for separating said distributed high-frequency signal into first and second separated signals according to said timing signal so that said first and second separated signals have an individual frequency of said first and second values, respectively,
        (3) an antenna having first and second feed lines for receiving said first and second separated signals, respectively, to form first and second transmission beams according to said first and second separated signals, said antenna receiving first and second reflected beams of said first and second transmission beams and outputting first and second power signals corresponding to said first and second reflected beams from said first and second feed lines, respectively, and
        (4) first and second output phase shifters connected to said first and second feed lines and said scan controller for receiving said first and second power signals to phase-shift said first and second power signals by a given amount in response to said scan signal;
    (f) first and second power combiners for combining outputs of a group of the first output phase shifters and a group of the second output phase shifters of said plurality of antenna units, respectively;
    (g) first and second receivers for receiving outputs of said first and second power combiners, respectively; and
    (h) a signal processor connected to said first and second receivers.

* * * * *